United States Patent [19]

Norden

[11] Patent Number: 4,653,834
[45] Date of Patent: Mar. 31, 1987

[54] PHOTOCONTROL RECEPTACLES

[76] Inventor: Alexander R. Norden, 350 Central Park West, New York, N.Y. 10025

[21] Appl. No.: 756,017

[22] Filed: Jul. 17, 1985

[51] Int. Cl.⁴ ............................ H01J 5/50; H02B 1/02
[52] U.S. Cl. ................................. 339/125 R; 250/239
[58] Field of Search ........................ 339/125 R, 89 M; 315/159; 361/173–177; 250/239; 362/14, 285; 74/813 L

[56] References Cited

U.S. PATENT DOCUMENTS

| | | | |
|---|---|---|---|
| 3,031,582 | 4/1962 | Benner et al. | 250/239 |
| 3,343,852 | 9/1967 | Blight et al. | 339/89 M |
| 3,379,892 | 4/1968 | Neagle | 250/239 X |
| 4,477,143 | 10/1984 | Taylor | 339/126 RS |

Primary Examiner—Eugene F. Desmond

[57] ABSTRACT

The disclosed receptacle for a directional light sensor is widely adjustable around an axis and is held in adjustment by a detent that can only be reached by a tool to release the detent when adjustment becomes necessary. The receptacle has hooks that are received in a circular hole in the mounting base, the hooks' retention being sustained as the receptacle is turned during adjustment. The receptacle is mounted on the base by a simple plug-in stroke.

10 Claims, 6 Drawing Figures

U.S. Patent    Mar. 31, 1987    4,653,834
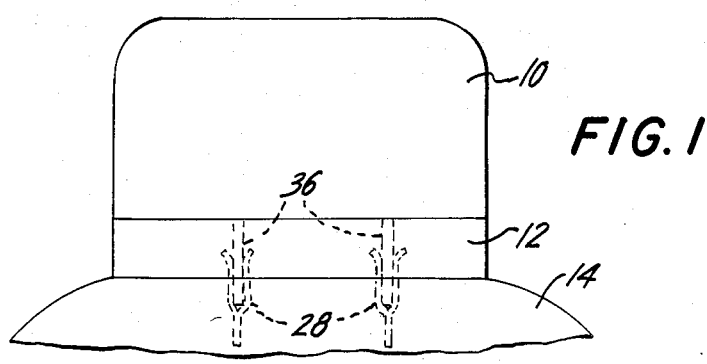
FIG. 1
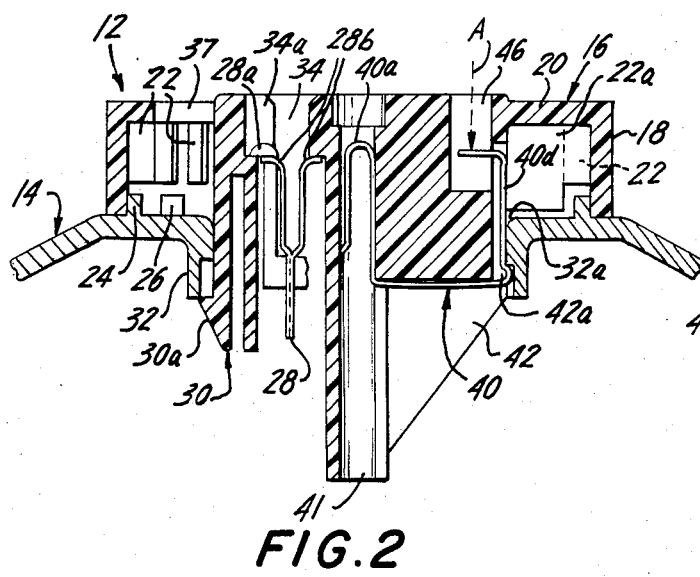
FIG. 2
FIG. 3
FIG. 4
FIG. 5
FIG. 6

PHOTOCONTROL RECEPTACLES

The present invention relates to photocontrol receptacles and, in particular, to such receptacles that are adapted to be adjusted about an axis.

Highway lamps are commonly turned on and off automatically under control of a light sensor that responds to ambient daylight. As a standard feature, the sensitivity of such sensors is directional. The sensor is usually a plug-in device that has a definite orientation relative to its receptacle.

The aim of the plug-in sensor is adjusted in any particular installation by adjusting the receptacle. Adjustably mounted receptacles for such sensors are unnecessarily complicated and therefore expensive and, depending on their design, they may become misadjusted either accidentally or due to tampering.

The present invention provides a novel adjustably mounted receptacle having several advantages. The illustrative and presently preferred receptacle can be assembled securely to its supporting base by a simple plug-in stroke and, after being mounted, the receptacle is adjustable around its axis. The receptacle is securely retained in adjustment by a detent mechanism which is positive-acting in the preferred embodiment of the invention, i.e., it is virtually impossible to turn the receptacle without deliberately releasing the detent. Moreover, the receptacle is locked in adjustment merely by relaxing the detent-releasing effort. As a further aspect of the invention, the detent has a tool-engageable part contained in a cavity. Using only one hand, a technician can insert a screwdriver so that the detent is released; then the receptacle can be rotated to the desired adjustment using the screwdriver as a handle, and when the screwdriver is removed, the detent becomes a positive lock.

The nature of the invention and its further novel aspects and advantages will be better appreciated from the following detailed description of an illustrative embodiment that is shown in the accompanying drawings.

In the drawings:

FIG. 1 is a somewhat diagrammatic side elevation of an embodiment of the invention;

FIG. 2 is a vertical cross-section of the apparatus of FIG. 1, omitting the plug-in unit 10 of FIG. 1, as viewed at th section-line 2—2 in FIG. 3;

FIG. 3 is a top plan view of the receptacle portion of FIG. 2;

FIG. 4 is an enlarged fragmentary view of a portion of FIG. 2;

FIG. 5 is an enlarged fragmentary bottom plan view of FIG. 2; and

FIG. 6 is a view like FIG. 4 showing a modification.

In the drawings, a light-sensor unit 10 is shown plugged into a receptacle 12 secured to base 14. When the apparatus is installed at any particular location, a knowledgeable installer adjusts receptacle 12 about its axis to establish a desired aim of sensor 10. After the initial installation and adjustment, it may be necessary to replace sensor 10 from time to time. The aim of each new sensor should not change. Therefore, the adjustment of the receptacle should not be disturbed as an old sensor is removed and as a new one is being plugged in.

FIG. 2 shows receptacle 12 mounted on cast-metal base 14. Receptacle 12 includes a body 16 of molded insulation. Cylindrical flange 18 extends down from top portion 20 of body 16. The edge of flange 18 rests on a circular bearing area of base 14. Upstanding circular ridge 24 of base 14 cooperates with flange 18 to form a dirt barrier and an inner bearing for flange 18. Small vanes 22 are integral stiffeners for flange 18.

One of the radial vanes 22a is enlarged (as shown) and cooperates with a localized stop 26 that projects integrally from base 14. Accordingly, rotation of receptacle 12 is limited, for preventing undue twisting of wires (not shown) connected to the receptacle.

There are three resilient hooks 30 that are integral portions of molded body 16. Base 14 has a short integral collar 32 projecting downward, concentric with ridge 24. The inner surface of collar 32 forms an opening through base 14 penetrated by portions of receptacle 12. Shoulders of hooks 30 are directly opposite the lower edge of collar 32 when flange 18 rests on base 14. Hooks 30 engage collar 32 in all rotational positions of the receptacle.

As shown somewhat diagrammatically in FIG. 1, receptacle 12 has multiple plug-in contacts 28 for gripping companion contacts 36 of the sensor 10. There are three contacts 28, only one of which is shown in FIG. 2. Contacts 36 of the standard sensor (diagrammatically shown) are of the twist-lock type; and both body 18 and contacts 28 are shaped correspondingly. Sensor contacts 36 are admitted to contacts 28 through openings 34 (FIG. 3) in molded body 18. When receptacle 12 is being assembled, contacts 28 are pushed upward into place along passages aligned with openings 34 in body 18. When hook portions 28a (FIGS. 2 and 3) reach molded slots 34a, they snap outward and engage ledges at the bottoms of slots 34a, holding contacts 28 securely captive in body 16.

An index 38 (FIG. 3) which represents "North" is formed as part of a raised area of the upper surface of top 20 of the receptacle. Holes 37 facilitate molding of hooks 30.

A central bore 41 in body 16 receives a bent-back portion 40a (FIG. 4) of wire spring 40. When portion 40a is forced into bore 41 (before the receptacle is mounted on base 14) the spring becomes captive in bore 41. A cut edge at an end of spring portion 40a bites into the surface of bore 41. Radial portion 40b of the spring is confined for movement in a radial slot in body 16 defined by spaced-apart wall portions 42 of the body (FIGS. 2 and 5). Detent portion 40c of the spring bulges radially outward. Collar 32 of the base has a circular series of spaced recesses 44 that open inward to receive detent portion 40c of the spring. The recesses 44 are distributed at close intervals all around the inner face of collar 32. The series of recesses 44 are concentric with bearing portions 18 and 24 of the receptacle and the base. The slot defined by walls 42 of the molded body 16 extends upward as a groove 42a; and upright spring portion 40d is confined in that groove. Parallel sides of each recess 44 have locking engagement with spring portion 40c. Depressing spring portion 40e distorts the spring into the dotted-line configuration of FIG. 4.

Operating portion 40e of the spring is disposed in cavity 46 (FIGS. 2 and 3) that opens upward. Cavity 46 provides for operating access to spring portion 40e. As seen in FIG. 4, pressure exerted downward against spring portion 40e (in the direction of broken-line arrow A) by a screw-driver or other suitable tool, shifts detent portion 40c downward and out of a recess 44. This frees receptacle 12 for rotary adjustment. The cavity also constitutes a socket for the tool that then serves as a handle in rotatably adjusting the receptacle while holding the spring detent released. This is a one-hand release-and-adjust operation. When "North" index 38 points in the proper direction, tool pressure against spring 40 is relaxed, allowing locking portion 40c to enter the nearest recess 44. In that condition of the spring, the receptacle is locked in its adjusted position. Groove 42a and walls 42 fix the radial position of spring 40 in body 16, yet permitting deliberate deflection of the spring into the released configuration represented in dotted lines in FIG. 4.

When contacts 28 and spring 40 have been assembled into molded body 16, receptacle 12 is complete. Receptacle 12 is assembled to base 14 by simply pushing it into place in the cylindrical opening formed by collar 32. As receptacle 12 is first being assembled to base 14, the rounded upper margin 32a of collar 32 cooperates cam-like with spring portion 40c and with the outer sloping portions 30a of hooks 30, deflecting hooks 30 and spring portion 40c toward the axis of the receptacle. Body 16 includes two more walls 42b (FIG. 5) like wall 42 (FIG. 2). These walls have parallel vertical edges that slide within collar 32 as the receptacle is being pushed into its final position. As soon as the receptacle reaches the position shown in FIG. 2, hooks 30 spring outward and the assembling operation is complete.

In a modification of spring 40 (FIG. 6), spring portion 40b' bows downward and spring portion 40e' slants such that a downward stroke of a tool along arrow A' deflects detent portion 40c' inward and releases detent portion 40c' from recess 44.

In both forms of construction (FIGS. 4 and 6) the spring detent is received in a recess 44 for positive retention. Unintentional forces tending to turn receptacle 12 develop, as when sensor 10 is being rotated or twisted after being plugged-in and when it is rotated prior to being pulled out for replacement. Such twisting forces applied to the receptacle do not disturb the receptacle's adjustment. Spring 40 and recesses 44 are shaped and proportioned in relation to each other so that the receptacle does not turn unless the spring detent is first released.

The described releasable and adjustable receptacle lock is especially well suited for maintaining the plugged-in light sensor in fixed adjustment that is established initially. It ensures that the sensor is properly oriented in each individual installation. Except for cavity 46, the detent mechanism shown and described is wholly protected. That feature is a safeguard against accidental rotation of the receptacle, since it requires the use of a tool to accomplish rotation.

Those skilled in the art will readily recognize options for modification and rearrangement. Consequently, the invention should be construed broadly in accordance with its true spirit and scope.

What is claimed is:

1. Electrical apparatus including a base and a receptacle on the base for receiving a sensor having directional sensitivity, said receptacle and said base having mutually cooperating bearing means supporting the receptacle for adjustment about an axis, plug-in electrical contacts in the receptacle for engagement by companion contacts of a sensor, said receptacle and said base having detent means for releasable securing the receptacle in selective adjustment about said axis, said detent means including a ring providing a series of recesses distributed in a circle coaxial with said bearing means and a spring detent having a detent portion receivable in any selected one of said recess for securing the receptacle in adjusted position on said base, said reccesses and said spring detect having locking interengagement with each other and said apparatus having means forming an opening that provides access for a tool to said spring detent for releasing said locking interengagement.

2. Apparatus as in claim 1 wherein that means which provides said opening is cooperable with an inserted spring-detent-releasing tool for adapting the tool to serve additionally as a handle for adjustably rotating the receptacle while the tool holds the spring detent released.

3. Electrical apparatus including a base and a receptacle on the base for receiving a sensor having directional sensitivity, said receptacle and said base having mutually cooperating bearing means supporting the receptacle for adjustment about an axis, plug-in electrical contacts in the receptacle for engagement by companion contact of a sensor, said receptacle and said base having a detent means for releasably securing the receptacle in selective adjustment about said axis, said detent means including a ring providing a series of recesses distributed in a circle coaxial with said bearing means and a spring detent having a detent portion receivable in any selected one of said recesses for securing the receptacle in adjusted position on said base, said receptacle including plurality resilient hooks distributed about said axis and cooperating with said base for securely retaining said bearing means of said receptacle and said base in mutual cooperation while accommodating adjustment of the receptacle about said axis.

4. Electrical apparatus including a base and a receptacle on the base for receiving a sensor having directional sensitivity, said receptacle and said base having mutually cooperating bearing means supporting the receptacle for adjustment about an axis, plug-in electrical contacts in the receptacle for engagement by companion contacts of a sensor, said receptacle and said base having a detent means for releasably securing the receptacle in selective adjustment about said axis, said detent means including a ring providing a series of recesses distributed in a circle coaxial with said bearing means and a spring detent having a detent portion receivable in any selected one of said recesses for securing the receptacle in adjusted position on said base, said spring detent being carried by and largely contained in said receptacle and said ring being part of said base concealed by said receptacle, said receptacle having a passage providing restricted access to a segment of the spring detent for a tool to release said detent portion of the spring detent from said ring preparatory to turning adjustment of the receptacle.

5. Apparatus as in claim 4, wherein said receptacle includes plural resilient hooks distributed about said axis and cooperating with said base for securely retaining said bearing means of said receptacle and said base in mutual cooperation while accommodating adjustment of the receptacle about said axis.

6. Apparatus as in claim 4, wherein said passage opens in an area of the receptacle covered by a sensor when plugged into the receptacle.

7. Apparatus as in claim 4, wherein said passage is defined by means that cooperates with an inserted spring-detent-releasing tool for enabling the tool to serve additionally for adjustably rotating the receptacle while holding the spring detent released.

8. Electrical apparatus including a base and a receptacle on the base for receiving a sensor having directional sensitivity, said receptacle and said base having mutually cooperating bearing means supporting the receptacle for adjustment about an axis, plug-in electrical contacts in the receptacle for engagement by companion contacts of a sensor, said receptacle and said base having detent means for releasably securing the receptacle in selective adjustment about said axis, said detent means including a ring providing a series of recesses distributed in a circle coaxial with said bearing means and a spring detent having a detent portion receivable in any selected one of said recesses for securing the receptacle in adjusted position on said base, said receptacle including plural resilient hooks cooperating with said ring for retaining said receptacle against axial displacement and said recesses in the ring and said spring detent being proportioned for secure interlocking engagement with each other, said apparatus providing a restricted access passage for a tool to release said spring from interlocking engagement with the recesses in the ring.

9. Electrical apparatus for adjustably mounting a sensor, including a receptacle having plug-in contacts for receiving a sensor in a prescribed relationship and a base, said receptacle and said base having mutually cooperating bearing means adapting the receptacle to be turned about an axis for angular adjustment of the sensor's orientation, said receptacle including resilient hook means having cam-like coaction with said base during assembly of receptacle to the base for facilitating plug-in assembly of the receptacle to the base and for maintaining such assembly while accommodating such angular adjustment, said base providing a collar having a circular edge and having a cylindrical surface that defines an opening through which said hook means extend, said hook means having shoulders abutting said circular edge, a series of recesses that open toward said axis being formed in said cylindrical surface, and said receptacle including a resilient detent biased radially outward and into cooperation with one of said series of recesses for arresting the receptacle in selected adjustment, said detent being movable with said hook means into said opening and into cooperation with said series of recesses during the aforesaid plug-in assembly of the receptacle to the base.

10. Electrical apparatus as in claim 9, wherein a passage is formed in said receptacle extending to said detent, said passage being formed for admitting a tool to release the detent and to serve as a handle for rotatably adjusting the receptacle while the tool holds the detent released.

* * * * *